Figure 1:
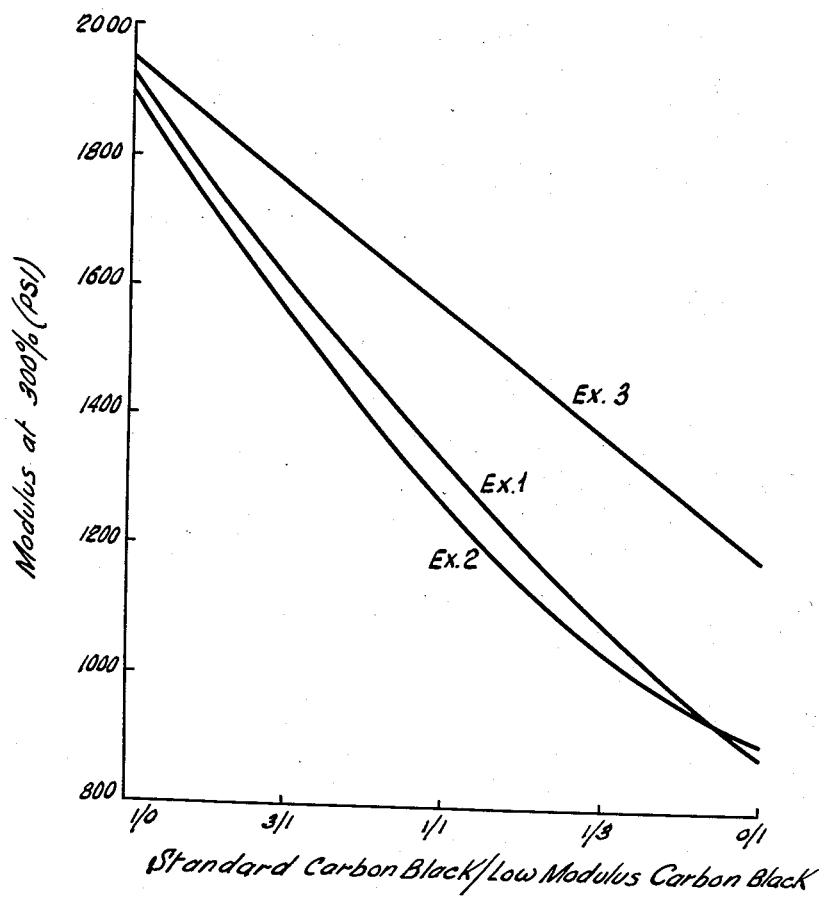

Jan. 7, 1964  N. L. SMITH  3,117,016
MANUFACTURE OF CARBON BLACK
Filed June 22, 1961  3 Sheets-Sheet 1

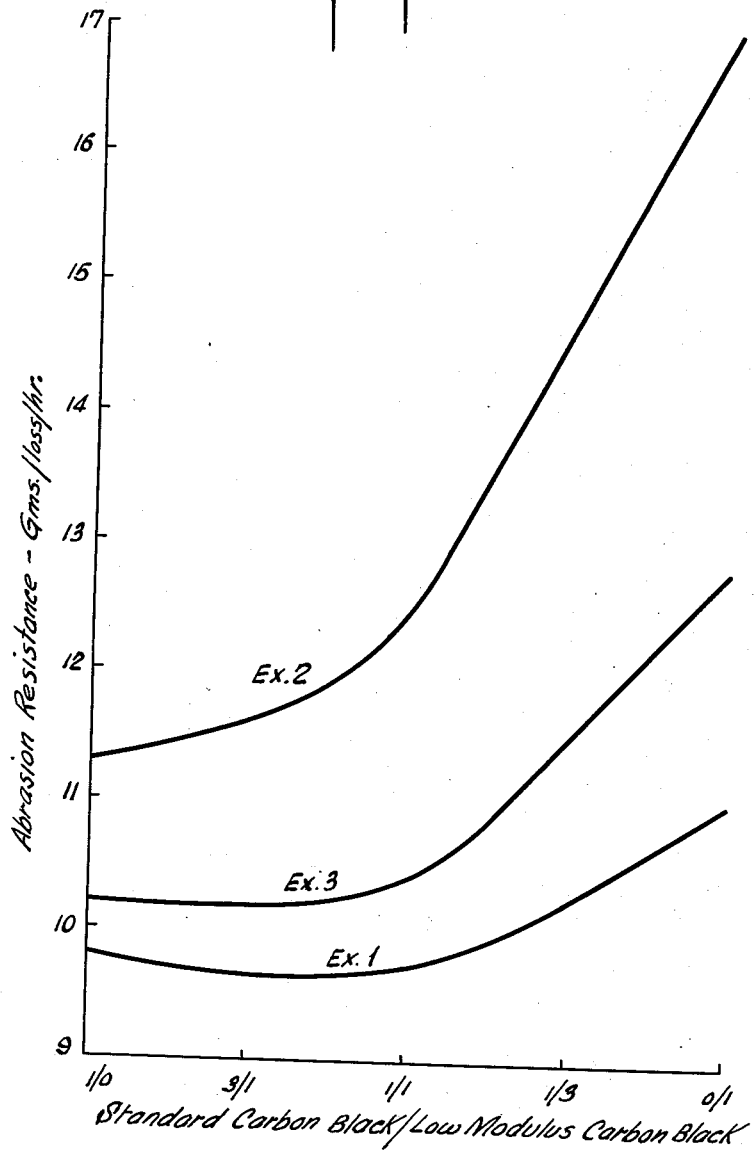

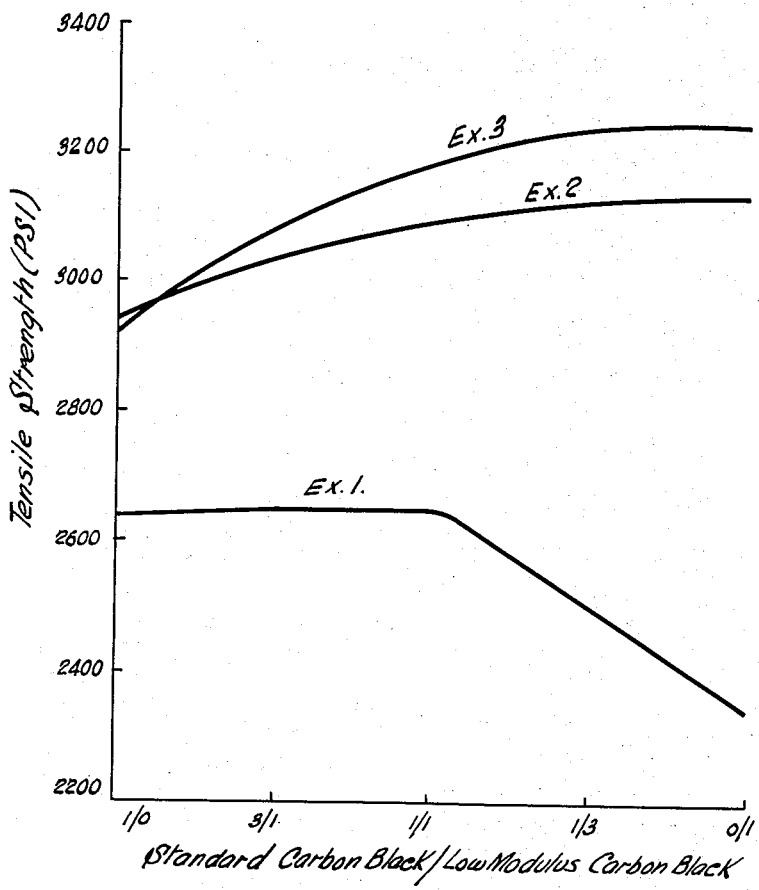

United States Patent Office 3,117,016
Patented Jan. 7, 1964

3,117,016
MANUFACTURE OF CARBON BLACK
Norman L. Smith, Borger, Tex., assignor to United Carbon Company, Houston, Tex., a corporation of Delaware
Filed June 22, 1961, Ser. No. 118,816
20 Claims. (Cl. 106—307)

This invention relates to carbon black. More particularly, it relates to an improved method for obtaining carbon black of preselected properties and the composition of matter so obtained.

The preparation of furnace type carbon blacks by the thermal decomposition of hydrocarbons is well known. In general, this method of preparation comprises decomposing a hydrocarbon feedstock by the heat generated from the burning of a portion of the hydrocarbon and/or by subjecting it to heat generated by the substantially complete combustion of a second, and generally different, hydrocarbon fuel. Hydrocarbon feedstock composition, type of feed stock injection, hydrocarbon fuel feed rate, oxygen to fuel ratio and reaction time, among others, are variables which may influence the yield as well as the rubber properties of the carbon black produced. While all of the above described variables influence the rubber properties of carbon black to some extent, the hydrocarbon feedstock employed appears to be one of the most, if not the most, important variable in this respect.

Thus, it has long been believed, for instance, that in order to modify the stress-strain properties of carbon black especially modulus, without engaging in any form of after-treatment of the carbon black such as oxidation, it was necessary to replace the hydrocarbon feedstock. The disadvantages attendant such a practice are readily apparent. In the first place, obtaining a predetermined modulus by such a method is strictly a trial and error procedure. Secondly, the capacity to accurately maintain a predetermined modulus once it has been obtained, is necessarily dependent on a continued source of supply of the selected feedstock. Conversely, any desired change of modulus of the carbon black produced requires a replacement of the hydrocarbon feedstock. Aside from these factors, however, is the more important fact that any modulus variation obtained by feedstock replacement is marginal at best and is usually accompanied by an adverse effect on the tensile strength and elongation properties of the carbon black.

More recently it has been suggested that modulus of carbon black might be controlled by thermally decomposing a hydrocarbon feedstock in the presence of any of various extraneous modulus control additives. Among such additives may be mentioned any of various solid carbonaceous materials as disclosed in application for U.S. Patent Serial No. 79,908, filed December 30, 1960, by Ivan Ceresna. Other materials which have been found effective to varying degrees in this respect are any of the alkali metals preferably employed in the form of any of their various compounds as more fully described in U.S. Patents Nos. 3,010,794 and 3,010,795. Also effective are various of the alkaline earth metals also preferably employed in the form of any of their various compounds as more fully described in application for U.S. Letters Patent Serial No. 89,147, filed February 14, 1961, by Ivan Ceresna. Still another method for controlling modulus of carbon black is through reaction temperature control as more fully described in application for U.S. Letters Patent Serial No. 106,100, filed April 27, 1961, by Norman L. Smith. Each of these methods is effective to one degree or another in producing carbon black of a preselected modulus without at the same time seriously affecting other tensile properties. A serious disadvantage to these methods, however, is that the property of abrasion resistance is badly degraded, although this appears to be not as serious a problem with the reaction temperature control method as with the additive control methods.

It is a principal object of this invention to overcome the above described disadvantage. It is a further object of this invention to provide an improved method of controlling modulus of carbon black so that a modulus of preselected value may be consistently obtained. It is a still further object of this invention to provide such a modulus control method which permits not only preparation of carbon black of preselected modulus but such preparation without adverse effect on other properties of the carbon black particularly abrasion resistance. An additional object of this invention is to provide a carbon black composition of matter whose resistance to abrasion remain substantially constant no matter what modulus value is preselected for it.

In accordance with this invention, these objects have been met in a surprisingly effective manner. In general, the instant invention is based upon the discovery that for a carbon black composition comprising a mixture of two carbon black components one of which has a lower modulus value but a higher abrasion resistance value than the second, the modulus and elongation properties of the composition fall linearly with increased percentages of lower modulus carbon black in the mixture, as might be expected. Most unexpectedly, however, it has been further discovered that while modulus of the composition falls linearly with increased percentage of lower modulus carbon black component in the mixture, abrasion resistance, within certain percentage limits of lower modulus carbon black, varies little if any from that of the lower abrasion resistance carbon black component. It has also been observed that this apparent synergism involving abrasion resistance is accompanied by a similar phenomenon with respect to the tensile strength. Thus, when the tensile strength of the lower modulus carbon black component is lower than that of the second carbon black component, the tensile of the composition, within certain percentage limits of the lower modulus carbon black component, varies little if any from that of the second carbon black component.

Referring to the drawing, FIGURE 1 illustrates that the modulus value of a composition comprising two carbon blacks having the indicated moduli is substantially a straight line function of the percentages of its two components. As illustrated in FIGURE 2 of the drawing, however, abrasion resistance, which might be expected to similarly vary directly as the ratio of components of the composition, quite unexpectedly remains substantially unchanged from the value of the lower abrasion or standard carbon black component so long as the amount of the lower modulus carbon black component is not substantially greater than that of the second or standard component. Beyond a certain ratio of components, abrasion resistance surprisingly begins to vary substantially directly as the ratio of the components. The initial ratio at which this occurs is influenced to some extent by the feedstock from which the two carbon blacks are prepared, but an apparent decrease in abrasion resistance becomes evident once the composition contains a major portion of the lower modulus carbon black component. Usually it will begin to occur once the ratio of lower modulus carbon black approaches about 40–60% as illustrated in FIGURE 2, which shows that the compositions of Examples 1 and 3 exhibit substantially no decrease in abrasion resistance at a component ratio of 1:1 while the decrease for the composition of Example 2 has already begun at a 1:1 ratio and becomes quite pronounced as the content of lower modulus component becomes greater.

The curves of FIGURE 3 illustrate another surprising facet of this invention. As shown by the curves of Examples 2 and 3 when the tensile strength of the lower modulus component is higher than that of the lower abrasion or standard component the tensile strengths of all compositions containing the two components are higher than the value of the standard component. However, when the tensile strength of the lower modulus component is lower than that of the standard component as shown by the curve of Example 1, the tensile strength of compositions containing the two components remains substantially the same as that of the lower abrasion or standard component so long as the amount of the lower modulus carbon black component is not substantially greater than that of the lower abrasion component. As with abrasion resistance, however, tensile in this instance surprisingly begins to vary substantially directly when the composition contains a major portion of lower modulus component. At what point this will occur will vary with the feedstocks from which the carbon blacks are produced but as with abrasion, it becomes quite evident once the percentage of lower modulus carbon black approaches about 40–60%, as illustrated by Example 1 of FIGURE 3.

The advantages of this invention may be realized merely by physically blending two commercially available carbon blacks one of which has modulus and abrasion resistance values lower and higher, respectively, than the other. As a practical matter, however, the advantages are readily obtained by blending two streams of carbon black-bearing gases in proper proportion, each stream containing a carbon black of preselected modulus, whereby a blended composition of preselected modulus is obtained. In a battery of reactors, therefore, such gas stream blending requires that only a portion of the total number of reactors be controlled for preparing the lower modulus product, while the remaining reactors are employed to prepare the lower abrasion or standard product. Blending carbon black-bearing gas streams has the added advantage, moreover, of requiring less critical control than that which is required when all reactors of a battery are employed to produce a product having a preselected modulus.

It is an advantage of this invention that the carbon blacks blended into the instant composition may be prepared by any of the procedures commonly employed in the production of furnace-type carbon black. Thus, while all furnace-type carbon blacks are, in general, produced by cracking a hydrocarbon using the heat generated by the combustion of a portion of the hydrocarbon and/or by the combustion of a second hydrocarbon, there are various different operational procedures by which this result is obtained. These various operational procedures differ primarily in the manner in which the reactants are introduced into the reactor and are well known to those skilled in the art. Such procedures as well as any others by which similar results are attained may be employed for preparing the carbon black components of the present composition.

Similarly, the hydrocarbon to be cracked in preparing the component carbon blacks of this invention may be widely varied. Any hydrocarbon whether liquid or gaseous and whether derived from a petroleum or non-petroleum source may be employed. Such hydrocarbons may have widely varied aliphatic or aromatic contents. Representative of these hydrocarbons are methane, butane, pentane, gas oils, kerosene, gasoline boiling range hydrocarbons, heavy and light naphthas, residual and cycle oils derived from a wide variety of distillation and cracking and reforming operations and the like. By hydrocarbon feedstock as used herein, therefore, is meant any of the above. The hydrocarbon fuel employed to generate heat for cracking of the feedstock may be the same as or different from the hydrocarbon feedstock. Usually, however, it will be natural gas when available.

The combustion supporting gas employed in the above procedures may be varied but usually will be an oxygen-bearing gas such as air, oxygen-enriched air, oxygen or the like employed in amounts sufficient to complete combustion of the hydrocarbon fuel as is well known in the art.

As previously indicated one suggested method for controlling the modulus of carbon black in order to produce a product of preselected modulus involves cracking a hydrocarbon in the presence of any of various extraneous modulus control additives. Among these may be mentioned the alkali metals and alkaline earth metals preferably employed in the form of any of their inorganic compounds such as the halides, carbonates fluosilicates, borates, hydroxides and the like. Generally, it has been found that as little as 0.001% by weight of the feedstock influences modulus of the resultant carbon black. Greater modulus decrease is obtained by increasing the amount of additive to as high as 3.0% and even higher, although there is usually no additional modulus decrease of any substance beyond about 2.0%. Also shown to be of particular advantage as modulus control additives are any of various normally solid carbonaceous materials of high fixed carbon content. Particularly suited are any of the several classes of coal including anthracite, bituminous, subbituminous and lignite as well as coke and charcoal. The amount of any of these additives necessary to obtain the desired result usually will be greater than the amount of an alkali metal or an alkaline earth metal required to obtain the same results. Although the amount may run as high as 15% by weight of the feedstock, it will more usually be in the range of about 3–7%.

The particular manner in which the control additive is introduced into the reactor may vary widely. Thus, for instance, it may be introduced in particulate form or as an aqueous solution, depending upon its solubility properties, and in either of these states it may be introduced separately from the reactants or in combination with one or more of the reactants. Where employed as a solid, the particle size of the control additive should be sufficiently uniform to permit ready injection into the reactor through injection means conventionally employed in the art and to permit smooth flow through usual flow measuring devices. To comply with these requirements, it has been found that a particle size of about 100% minus 200 mesh U.S. sieve series is especially suited.

An additional method of controlling modulus of carbon black is through reactor temperature control. In accordance with this method, it has been found that modulus may be varied about 5–11% for every 75–125° temperature change. The particular method for varying the reactor or decomposition temperature may take various forms. A particularly satisfactory procedure is to establish and maintain constant the fuel and combustion-supporting gas flow rates while varying the feedstock flow rate to establish the decomposition temperature predetermined for the selected modulus.

The efficacy of this invention is illustrated by the following examples in which all parts are by weight unless otherwise indicated. In each example, the reactor comprises a combustion chamber axially communicating with a reaction chamber of smaller diameter and greater length. Natural gas as the fuel and air as the oxygen-bearing combustion-supporting gas are introduced into the combustion chamber at feed rates such as to provide a ratio of air to gas of 15:1. The fuel is substantially entirely consumed prior to entering the reaction chamber. Feedstock is sprayed axially through the combustion chamber into the reaction chamber wherein it is decomposed to carbon black. When decomposition temperature is varied to modify modulus, it is accomplished by adjusting the feedstock rate. The reaction is stopped by quenching with water and the carbon black-bearing gases subjected to conventional treatment to recover the carbon black.

The feedstocks employed in the examples have the following analyses.

| Analysis | Hydrocarbon Feedstock | | |
|---|---|---|---|
| | I | II | III |
| Gravity, API @ 60° F | 16.3 | 5.0 | 16.5 |
| Viscosity, SU sec./° F | 31.8/210 | 43.7/210 | 39.5/100 |
| Ash, weight percent | 0.0 | 0.019 | 0.000 |
| Conradson Carbon, percent | 1.75 | 7.12 | 0.30 |
| Sulfur, percent | 0.73 | 1.09 | 0.00 |
| Aromatics, percent | 63.58 | 73.09 | 45.56 |
| Asphaltenes, percent | 0.61 | 1.71 | 0.616 |
| Carbon, percent | 88.85 | 90.05 | 88.85 |
| Hydrogen, percent | 9.89 | 8.60 | 9.89 |
| Distillation: | | | |
| IMP, °F., 760 mm | 420 | 407 | 390 |
| 5% | 465 | 572 | 468 |
| 10% | 482 | 609 | 491 |
| 20% | 495 | 658 | 507 |
| 30% | 514 | 694 | 523 |
| 40% | 531 | 723 | 541 |
| 50% | 550 | 752 | 566 |
| 60% | 580 | 788 | 582 |
| 70% | 604 | 837 | 622 |
| 80% | 634 | 894 | 666 |
| 90% | 689 | 969 | 699 |

EXAMPLE 1

Feedstock I is reacted as above described in two separate runs at decomposition temperatures of 2640° F. and 3050° F. to produce standard carbon black A and low modulus carbon black B. A composition is then prepared by physically blending carbon blacks A and B in ratios of 3:1, 1:1 and 1:3. Each of carbon blacks A and B and the compositions are compounded according to the following recipe, cured at 293° F., and tested for stress-strain properties and abrasion resistance. Tensile data are averages of 25, 40, 60, 90 and 120 minutes cures. Angle abrasion is determined on 90 minute cure. Angle abrasion values and averages of modulus and tensile strength are used to construct the curves of the drawings. Results appear in Table I.

Ingredient: Parts
SBR-1500 _____ 100
Carbon black _____ 50
Softener _____ 5
Zinc oxide _____ 5
Sulfur _____ 2
Stearic acid _____ 1.5
Mercaptobenzothiazole _____ 0.8
Diphenylguanidine _____ 0.25

*Table I*

| Property | Carbon Black | | | | |
|---|---|---|---|---|---|
| | A | 75% A, 25% B | 50% A, 50% B | 25% A, 75% B | B |
| Modulus at 300% (p.s.i.) | 1,930 | 1,600 | 1,330 | 1,090 | 890 |
| Tensile at Break (p.s.i.) | 2,640 | 2,650 | 2,650 | 2,500 | 2,340 |
| Elong. at Break (percent) | 390 | 450 | 510 | 550 | 595 |
| Angle Abrasion (gms. loss/hr.) | 9.8 | 9.7 | 9.7 | 10.2 | 11.0 |

EXAMPLE 2

Feedstock II is reacted as above described in two separate runs at a decomposition temperature of about 2640° F. In one run, a 15% aqueous NaCl solution is injected into the reactor at a rate sufficient to provide 1.5% NaCl by weight of feedstock. Standard carbon black A and low modulus carbon black B are thus obtained and physically blended together to give compositions in which A and B are in ratios of 3:1, 1:1 and 1:3. Carbon blacks A and B and the compositions are then compounded and tested as in Example 1. Results appear in Table II and the drawing.

*Table II*

| Property | Carbon Black | | | | |
|---|---|---|---|---|---|
| | A | 75% A, 25% B | 50% A, 50% B | 25% A, 75% B | B |
| Modulus at 300% (p.s.i.) | 1,900 | 1,560 | 1,400 | 1,050 | 910 |
| Tensile at break (p.s.i.) | 2,940 | 3,030 | 3,050 | 3,160 | 3,130 |
| Elong. at break (percent) | 405 | 450 | 475 | 545 | 565 |
| Angle Abrasion (gms. loss/hr.) | 11.3 | 11.6 | 12.4 | 14.8 | 16.9 |

EXAMPLE 3

Hydrocarbon feedstock III is reacted as above described. Two runs are made under identical conditions except that in one run 3% by weight of the feedstock of a bituminous coal in pulverulent form introduced into the reactor as a modulus control additive. The coal, having carbon and hydrogen contents of 78.39% and 5.05%, respectively, is of a size range −200 +300 mesh U.S. sieve series and is introduced into the reactor by being suspended in the feedstock. Standard carbon black A and low modulus carbon black B thus obtained and compositions obtained by blending the two products are then compounded as in Example 1 and tested. Average tensile properties as well as angle abrasion at 90 minutes appear in Table III.

*Table III*

| Property | Carbon Black | | | | |
|---|---|---|---|---|---|
| | A | 75% A, 25% B | 50% A, 50% B | 25% A, 75% B | B |
| Modulus at 300% (p.s.i.) | 1,950 | 1,740 | 1,550 | 1,380 | 1,190 |
| Tensile at break (p.s.i.) | 2,920 | 3,060 | 3,160 | 3,260 | 3,240 |
| Elong. at break (percent) | 395 | 440 | 495 | 520 | 540 |
| Angle Abrasion (gms. loss/hr.) | 10.2 | 10.2 | 10.4 | 11.5 | 12.8 |

EXAMPLE 4

When any of Examples 1–3 are repeated and blending is accomplished by bringing together reaction gases bearing the different modulus level carbon blacks, similar results are obtained as those reported in Tables I–III.

EXAMPLE 5

The procedure of Example 2 is repeated replacing sodium chloride with calcium chloride as the modulus control agent. When the resultant carbon blacks are blended, the compositions obtained evidence similar modulus and abrasion resistance characteristics as those of Example 2.

EXAMPLE 6

The procedure of Example 3 is repeated replacing the coal with both coke and charcoal as modulus control agents. When the high and low modulus carbon blacks are blended, the resultant compositions evidence similar modulus and abrasion resistance characteristics as those of Example 3.

The above examples clearly illustrate that two carbon blacks, one of which has a lower modulus value and a higher abrasion resistance value than the other, may be blended to form a composition the modulus value of which may be preselected to fall within the limits of the two components while maintaining the lower abrasion resistance value. It is to be understood, of course, that the above examples are illustrative only and demonstrate the efficacy of this invention with respect to certain carbon blacks produced from representative feedstocks and using certain modulus control methods. It is just as applicable to carbon blacks produced from other feedstocks and whose varying moduli have been obtained by other means.

I claim:

1. A carbon black composition consisting essentially of a mixture of two carbon blacks the first of which carbon blacks has a lower modulus value and a higher abrasion resistance value than the second of said carbon blacks, the ratio of said second carbon black to said first carbon black being at least about 1:1 whereby said mixture has a preselected modulus value intermediate the modulus values of said two carbon blacks and an abrasion resistance value substantially the same as that of said second carbon black.

2. A mixture according to claim 1 in which the carbon blacks are produced by thermally decomposing a hydrocarbon feedstock, the decomposition of the hydrocarbon feedstock to produce said first carbon black being conducted in the presence of an amount of an alkali metal effective to produce said lower modulus value of said first carbon black.

3. A mixture according to claim 2 in which the alkali metal is potassium.

4. A mixture according to claim 1 in which the carbon blacks are produced by thermally decomposing a hydrocarbon feedstock, the decomposition of the hydrocarbon feedstock to produce said first carbon black being conducted in the presence of a solid carbonaceous material selected from the group consisting of coal, coke and charcoal.

5. A mixture according to claim 1 in which the carbon blacks are produced by thermally decomposing a hydrocarbon feedstock, the decomposition of the hydrocarbon feedstock to produce said first carbon black being conducted in the presence of an alkaline earth metal.

6. A mixture according to claim 5 in which the alkaline earth metal is calcium.

7. A mixture according to claim 4 in which the material is coke.

8. A mixture according to claim 4 in which the material is coke.

9. A mixture according to claim 4 in which the material is charcoal.

10. In a process for preparing carbon black by thermally decomposing a hydrocarbon feedstock, the improved method for obtaining a carbon black of preselected modulus which comprises: decomposing a first portion of said feedstock in a manner so as to produce a first carbon black-bearing gas stream the carbon black of which has modulus and abrasion resistance values lower and higher, respectively, than the carbon black of a second carbon black-bearing gas stream produced from the remainder of said feedstock; combining said gases and collecting from said resultant combined gas stream a mixture of said first and second carbon blacks, the ratio of said first portion of said feedstock to said remainder of said feedstock being such as to provide said mixture with a ratio of said second carbon black to said first carbon black of at least about 1:1, whereby said mixture has a preselected modulus value intermediate the modulus values of said first and second carbon blacks and an abrasion resistance value substantially the same as that of said second carbon black.

11. A method according to claim 10 in which said first portion of said feedstock is thermally decomposed in the presence of an amount of an alkali metal effective to produce said lower modulus carbon black of said first carbon black-bearing gas stream.

12. A method according to claim 11 in which the alkali metal is potassium.

13. A method according to claim 10 in which said first portion of said feedstock is thermally decomposed in the presence of an amount of a solid carbonaceous material selected from the group consisting of coal, coke and charcoal effective to produce said lower modulus carbon black of said first carbon black-bearing stream.

14. A method according to claim 10 in which said first portion of said feedstock is thermally decomposed in the presence of an amount of an alkaline earth metal effective to produce said lower modulus carbon black of said first carbon black-bearing stream.

15. A method according to claim 14 in which the alkaline earth metal is calcium.

16. A method according to claim 13 in which the material is coal.

17. A method according to claim 13 in which the material is coke.

18. A method according to claim 13 in which the material is charcoal.

19. A method according to claim 10 in which said first portion of said feedstock is thermally decomposed at a temperature higher than is said remainder of said feedstock.

20. A method of preparing carbon black of preselected modulus which comprises forming a mixture of two carbon blacks the first of which has lower modulus and higher abrasion resistance values than the second, the ratio of said second carbon black to said first carbon black being at least about 1:1, whereby said mixture has a preselected modulus value intermediate the modulus values of said two carbon blacks and an abrasion resistance value substantially the same as that of said second carbon black.

References Cited in the file of this patent
UNITED STATES PATENTS 3,010,794     Friauf et al. _____ Nov. 28, 1961
3,010,795     Friauf et al. _____ Nov. 28, 1961

UNITED STATES PATENT OFFICE
CERTIFICATE OF CORRECTION

Patent No. 3,117,016            January 7, 1964

Norman L. Smith

It is hereby certified that error appears in the above numbered patent requiring correction and that the said Letters Patent should read as corrected below.

In the grant, lines 1 to 3, for "assignor to United Carbon Company, of Houston, Texas, a corporation of Delaware," read -- assignor, by mesne assignments, to Ashland Oil & Refining Company, of Ashland, Kentucky, a corporation of Kentucky, --; line 12, for "United Carbon Company, its successors" read -- Ashland Oil & Refining Company, its successors --; in the heading to the printed specification, lines 3 to 5, for "assignor to United Carbon Company, Houston, Tex., a corporation of Delaware" read -- assignor, by mesne assignments, to Ashland Oil & Refining Company, Ashland, Ky., a corporation of Kentucky --; column 2, line 16, for "remain" read -- remains --; column 6, line 19, after "form" insert -- is --; column 7, line 38, for "coke" read -- coal --.

Signed and sealed this 16th day of June 1964.

(SEAL)
Attest:

ERNEST W. SWIDER            EDWARD J. BRENNER
Attesting Officer            Commissioner of Patents